United States Patent [19]

Yuki et al.

[11] Patent Number: 5,308,910
[45] Date of Patent: May 3, 1994

[54] COMPOSITION, ADHESIVE AND AQUEOUS EMULSION

[75] Inventors: Ken Yuki, Osaka; Masato Nakamae; Hitoshi Maruyama, both of Kurashiki; Tatsuaki Hattori, Tokyo, all of Japan

[73] Assignee: Kuraray Co., Ltd., Kurashiki, Japan

[21] Appl. No.: 903,449

[22] Filed: Jun. 24, 1992

[30] Foreign Application Priority Data

Jun. 25, 1991 [JP] Japan .................................. 3-153078

[51] Int. Cl.$^5$ ............................................. C08L 29/04
[52] U.S. Cl. ................................... 524/503; 524/459; 525/123
[58] Field of Search ................. 524/459, 503; 525/123

[56] References Cited

U.S. PATENT DOCUMENTS

| | | | |
|---|---|---|---|
| 3,931,088 | 1/1976 | Sakurada et al. | 260/29.6 RB |
| 4,609,690 | 9/1986 | Gruber et al. | 523/334 |
| 4,767,816 | 8/1988 | Iacoviello et al. | 524/459 |
| 5,092,953 | 3/1992 | Derby et al. | 524/459 X |

FOREIGN PATENT DOCUMENTS

| | | |
|---|---|---|
| 0394774 | 4/1990 | European Pat. Off. . |
| 2196378 | 3/1974 | France . |
| 48-94739 | 12/1973 | Japan . |
| 49-26346 | 3/1974 | Japan . |
| 50-69139 | 6/1975 | Japan . |
| 60-197229 | 10/1985 | Japan . |
| 2302485 | 12/1990 | Japan . |
| 333178 | 2/1991 | Japan . |
| 2643642 | 3/1978 | United Kingdom . |

Primary Examiner—Judy M. Reddick
Attorney, Agent, or Firm—Oblon, Spivak, McClelland, Maier & Neustadt

[57] ABSTRACT

There is disclosed a composition which comprises an aqueous emulsion selected from (A-1) aqueous emulsion comprising a dispersoid which comprises a vinyl ester polymer (1) and a copolymer a (meth)acrylic ester and a primary hydroxyl group-containing ethylenically unsaturated monomer (2), the polymer (1) being present principally in the central part of the dispersoid, the copolymer (2) having a glass transition temperature of lower than 50° C. an being present principally in the peripheral part thereof; and a dispersant comprising a vinyl alcohol polymer and (A-2) aqueous emulsion comprising a dispersoid which comprises a copolymer of a hydrophobic unsaturated monomer such as (meth)acrylic ester and a primary hydroxyl group-containing ethylenically unsaturated monomer; and a dispersant comprising a vinyl alcohol polymer having a mercapto group at an end thereof and a (B) polyvalent isocyanate compound. Disclosed also are an adhesive comprising the aforementioned composition and a wooden product which is joined by the use of the adhesive. The above-disclosed adhesive is excellent in initial adhesivity, adhesive strength, water resistance and so forth.

4 Claims, 1 Drawing Sheet

COMPOSITION, ADHESIVE AND AQUEOUS EMULSION

BACKGROUND OF THE INVENTION

1. Field of the Invention

The present invention relates to a composition, an adhesive and an aqueous emulsion. More particularly, it pertains to a composition useful for a variety of use especially as an adhesive. An adhesive excellent in initial adhesivity, adhesive strength and water resistance which comprises said composition, and an aqueous emulsion as the material for said adhesive and the like.

2. Description of the Related Arts

Differing from the conventional aminoplast adhesive, an adhesive which comprises as principal ingredients, a water-soluble high molecular compound, an aqueous emulsion and an isocyanate compound is free from the generation of formalin and develops an extremely high adhesive strength and water resistance only by press bonding at ordinary temperature for a relatively short time and therefore, is admirably used as an adhesive for wood (refer to, for example Japanese Patent Application Laid-Open Nos. 94739/1973 and 69139/1975). There have been proposed also as the similar adhesives, an aqueous adhesive composition which comprises the emulsion of a copolymer of a hydroxyl group-containing monomer such as allyl alcohol, 2-hydroxyethyl acrylate, N-methylolacrylamide or the like and vinyl acetate or the like; and a divalent isocyanate compound (Japanese Patent Application Laid-Open No. 26346/1974) and water-resistant adhesive composition comprising a polyvinyl acetate emulsion using a polyvinyl alcohol as a dispersant (protective colloid) and a polyvalent isocyanate compound (Japanese Patent Application Laid-Open No. 33178/1991). There is reported an adhesive comprising a polymer emulsion stabilized by polyvinyl alcohol, said polymer emulsion being produced by two-stage polymerization process wherein in the first stage is produced a vinyl acetate copolymer having a glass transition temperature of 10° to 40° C. and in the second stage is produced a methyl methacrylate copolymer having a glass transition temperature of 50° to 120° C. at a ratio of the vinyl acetate copolymer to the methyl methacrylate copolymer being 10:1 to 10:6 (Japanese Patent Application Laid-Open No. 302485/1990).

Moreover, there is disclosed an aqueous emulsion usable for an adhesive comprising as the dispersoid, polystyrene, polymethyl methacrylate, polymethyl acrylate, methyl methacrylate/butadiene copolymer, polyvinyl chloride or polyvinyl acetate and as the suspending agent, polyvinyl alcohol having a mercapto group at an end thereof (Japanese Patent Application Laid-Open No. 197229/1985).

Under such circumstances, there has recently been established Japanese Industrial Standard (JIS) regarding adhesives for wood comprising an aqueous high molecular compound and an isocyanate compound.

With increase in the objects to be bonded, however, there has arisen the necessity for further enhancing the present adhesivity level as the case may be. Specifically, an adhesive is sometimes required to have higher durability as the structural adhesive or further enhanced initial adhesivity as ordinary adhesive for individual use. In the case of the latter, the versatile application of an aqueous emulsion of a vinyl acetate resin using polyvinyl alcohol (hereinafter sometimes abbreviated to "PVA") as the dispersant has enhanced initial adhesivity but has caused the problem of water resistance being insufficient.

For the requirement of high durability and/or high water resistance there have heretofore been admirably employed an aqueous emulsion of acrylic series and that of styrene/butadiene rubber (SBR). However, since in the above-mentioned aqueous emulsions has been used an anionic surfactant or a nonionc surfactant alone or in combination with each other as the dispersant at the time of emulsion polymerization, the aqueous emulsions have involved the problem that they could not develop such initial adhesivity like the aqueous emulsion of vinyl acetate resin obtained by using PVA as the dispersant and the problem of inferior operation efficiency.

It is the present state of the aforementioned conventional adhesives that in spite of their performance being recognized to some extent, an adhesive having satisfactory performance in all respects of initial adhesivity, adhesive strength and water resistance still remains undeveloped.

SUMMARY OF THE INVENTION

It is an object of the present invention to solve the problems of the prior arts as described hereinbefore and thereby provide a composition well suited for use in an adhesive having satisfactory initial adhesivity as well as excellent adhesive strength and water resistance.

It is another object of the present invention to provide an adhesive having satisfactory initial adhesivity as well as excellent adhesive strength and water resistance which adhesive is obtained by the use of the above-mentioned composition.

It is still another object of the present invention to provide a wooden product excellent in adhesive strength and water resistance which is obtained by the use of the above-mentioned adhesive.

It is a further object of the present invention to provide an aqueous emulsion which constitutes a component of the above-mentioned composition.

It is a still further object of the present invention to provide a process for efficiently producing the above-mentioned aqueous emulsion.

Other objects of the present invention will be obvious from the text of the specification hereinafter disclosed.

The composition according to the present invention comprises an (A) aqueous emulsion selected from an (A-1) aqueous emulsion comprising a dispersoid which comprises a vinyl ester polymer (1) and a copolymer having a glass transition temperature of lower than 50° C. containing at least one member selected from methacrylic ester monomer unit and acrylic ester monomer unit; and a primary hydroxyl group-containing ethylenically unsaturated monomer unit (2), said polymer (1) being present principally in the central part of said dispersoid, said copolymer (2) being present principally in the peripheral part thereof, the ratio by weight of said polymer (1) to said copolymer (2) being in the range of 9:1 to 1:9; and a dispersant comprising a vinyl alcohol polymer and an (A-2) aqueous emulsion comprising a dispersoid which comprises a copolymer containing at least one hydrophobic unsaturated monomer unit selected from the group consisting of methacrylic ester monomer unit, acrylic ester monomer unit, styrenic monomer unit, diene monomer unit and halogenated unsaturated monomer unit; and a primary hydroxyl group-containing ethylenically unsaturated monomer unit in an amount of 0.1 to 50% by weight based on said copolymer; and a dispersant comprising a vinyl alcohol polymer having a mercapto group at an end thereof and a (B) polyvalent isocyanate compound.

DESCRIPTION OF THE PREFERRED EMBODIMENTS

Figure 1:
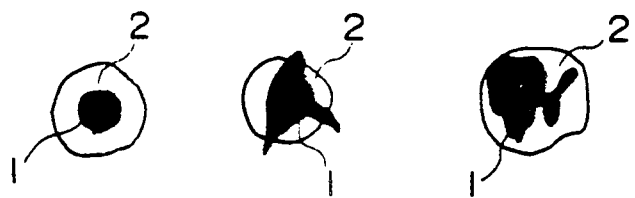
FIG. 1 is an explanatory drawing schematically showing the structure of the dispersoid in the (A-1) aqueous emulsion in which the symbol 1 is the polymer (1) and the symbol 2 is the copolymer (2).

The composition according to the present invention comprises (A) an aqueous emulsion and (B) a polyvalent isocyanate compound, said emulsion comprising an (A-1) aqueous emulsion or (A-2) aqueous emulsion. The (A-1) aqueous emulsion comprises the dispersoid and the dispersant described hereinbefore. The dispersoid is the aggregate of each being composed of the vinyl ester polymer (1) and the copolymer having a glass transition temperature of lower than 50° C. containing at least one member selected from methacrylic ester monomer unit and acrylic ester monomer unit (hereinafter sometimes collectively referred to as "(meth)acrylic ester monomer unit") and a primary hydroxyl group-containing ethylenically unsaturated monomer unit (2).

The vinyl ester polymer (1) includes a variety of polymers and is generally exemplified by the (co)polymers comprising as primary unit, the vinyl ester unit such as vinyl acetate, vinyl propionate, vinyl pivalate, vinyl ester of tertiary carboxylic acid having 8 to 10 carbon atoms (for example, vinyl ester produced by Shell Chemical Co., Ltd. under the tradename "Veova 10"), vinyl stearate, vinyl formate, vinyl valerate, vinyl caprinate, vinyl laurate and vinyl benzoate; and the copolymer of any of the above-mentioned vinyl ester units and not more than 30% by weight of a copolymerizable monomer unit such as ethylene or vinyl chloride and a monomer unit having a small amount of a functional group such as carboxyl group or amide group. The glass transition temperature (Tg) of the aforementioned vinyl ester polymer (1) is not specifically limited but is preferably in the range of −10° C. to 40° C. A Tg of the polymer (1) of lower than −10° C. or higher than 40° C. may lower the adhesive strength when the aqueous emulsion is used as an adhesive.

The copolymer (2) is the copolymer containing a (meth)acrylic ester monomer unit and a primary hydroxyl group-containing ethylenically unsaturated monomer unit and having a glass transition temperature (Tg) of lower than 50° C., desirably from 5° C. to lower than 50° C., more desirably from 10° C. to 40° C. A Tg of lower than 5° C. may decrease the adhesive strength because of insufficient cohesive force in the case where the aqueous emulsion is used as an adhesive, whereas a Tg of higher than 50° C. deteriorates the film-forming properties resulting in decrease in the adhesive strength in the case same as above.

The (meth)acrylic ester monomer unit constituting the copolymer (2) is methacrylic ester monomer unit and/or acrylic ester monomer unit and desirably contains both the methacrylic ester monomer unit and the acrylic ester monomer unit.

The methacrylic ester monomer unit includes a variety of species and is preferably exemplified by a monomer unit having an alkyl group of 1 to 12 carbon atoms such as those derived from methyl methacrylate, ethyl methacrylate, propyl methacrylate, butyl methacrylate, 2-ethylhexyl methacrylate, dodecyl methacrylate and dimethylaminoethyl methacrylate; the units each derived from a quaternary compound of any of the aforestated 7 monomer units; and the units each derived from any of methacrylamide and ethylene glycol dimethacrylate, among which is preferable a methacrylic ester unit having an alkyl group of 1 to 4 carbon atoms.

As is the case with the above, the acrylic ester monomer unit includes a variety of species and is exemplified by a monomer unit having an alkyl group of 1 to 12 carbon atoms such as those derived from methyl acrylate, ethyl acrylate, propyl acrylate, butyl acrylate, 2-ethylhexyl acrylate, decyl acrylate, dodecyl acrylate and dimethylaminoethyl acrylate; the units each derived from a quaternary compound of any of the aforesaid 8 monomer units; and the units each derived from any of acrylamide, N,N-dimethylacrylamide, acrylamide-2-methylpropanesulfonic acid and sodium salt thereof, among which is preferable an acrylic ester unit having an alkyl group of 1 to 4 carbon atoms.

Also, the primary hydroxyl group-containing ethylenically unsaturated monomer unit includes a variety of species and is preferably exemplified by those derived from hydroxyethyl acrylate, hydroxyethyl methacrylate, caprolactone-modified (meth)acrylic ester, N-alkylolamide from $\alpha,\beta$-ethylenically unsaturated carboxylic acid having 3 to 10 carbon atoms such as N-methylolacrylamide, N-ethanolacrylamide, N-propanolacrylamide, N-methylolmethacrylamide, N-ethanolmethacrylamide and N-methanolmaleamide, and allyl alcohol.

The aforestated (meth)acrylic ester monomer unit and primary hydroxyl group-containing ethylenically unsaturated monomer unit may contain one member or at least two members in combination, respectively.

The foregoing copolymer (2) may contain a copolymerized monomer unit in addition to the above-described (meth)acrylic ester monomer unit and primary hydroxyl group-containing ethylenically unsaturated monomer unit insofar as the copolymer has a glass transition temperature (Tg) of lower than 50° C., such copolymerized monomer unit being exemplified by styrenic unit and diene unit such as butadiene and isoprene. In addition, the copolymer (2) may contain a monomer unit having a functional group other than a primary hydroxyl group or divinyl monomer unit such as ethylene glycol dimethacrylate.

As mentioned hereinbefore, the copolymer (2) is composed of the (meth)acrylic ester monomer unit and primary hydroxyl group-containing ethylenically unsaturated monomer unit. The proportion of each of the aforesaid constitutional units is not specifically limited insofar as the copolymer has a Tg of lower than 50° C., but the (meth)acrylic ester monomer unit is in an amount of usually 85 to 99.8% by weight, preferably 99 to 99.5% by weight each based on the total amount of the copolymer (2). In the case where both the methacrylic ester monomer unit and acrylic ester monomer unit are used as the (meth)acrylic ester unit, the methacrylic ester monomer unit is in an amount of usually 20 to 70% by weight, preferably 30 to 65% by weight, and the acrylic ester monomer unit is in an amount of 20 to 50% by weight, preferably 25 to 45% by weight. The primary hydroxyl group-containing ethylenically unsaturated monomer unit is in an amount of 0.1 to 50% by weight, desirably 0.2 to 15% by weight, more desirably 0.5 to 10% by weight. An unreasonably small content of the primary hydroxyl group-containing ethylenically unsaturated monomer unit results in insufficient improvement in water resistance of the adhesive obtained therefrom.

The dispersoid in the (A-1) aqueous emulsion according to the present invention is the aggregate of each dispersoid comprising polymer (1) and copolymer (2), which form an double layer structure wherein the polymer (1) is present principally in the central part of the dispersoid, while the copolymer (2) is present principally in the peripheral part thereof. In more detail, the structure of the dispersoid is such that the polymer (1) (specifically in an amount of at least 70% by weight, desirably at least 80% by weight, particularly desirably at least 90%) is present in the central part of the dispersoid, whereas the copolymer (2) (specifically in an amount of at least 70% by weight, desirably at least 80% by weight, particularly desirably at least 90%) is present in the peripheral part thereof. The polymer (1) and copolymer (2) which constitute the dispersoid are each not always in the shape of sphere, but may be in different shapes as illustrated in FIG. 1 schematically showing the magnified structure of the dispersoid, wherein the symbol 1 is the polymer (1) and the symbol 2 is the copolymer (2). Such double layer structure of the dispersoid can be confirmed by means of a transmission electron microscope. The ratio by weight of the polymer (1) to the copolymer (2) in the suspensoid is 9:1 to 1:9, preferably 8:2 to 2:8. In the case where the percentage by weight of the polymer (1) based on the total amount of the polymer (1) and copolymer (2) exceeds 90%, the adhesive obtained from the aqueous emulsion is deteriorated in water resistance, whereas the percentage less than 10% by weight decreases the emulsion stability.

As described hereinbefore, the (A-1) aqueous emulsion comprises the above-mentioned dispersoid and dispersant in which vinyl alcohol polymer (PVA) is used. As the above PVA, the previously known PVA is available and suitable examples thereof include the PVA having a degree of hydrolysis of 80 to 99 mol% and a degree of polymerization of 200 to 8000 and the so called modified PVA, in which a functional group is introduced in the main or side chain or to the end of molecule thereof. Also, a previously known emulsion stabilizer other than PVA may be used in combination with the PVA as a component of the dispersant to the extent that the addition of the dispersant does not impair the performance such as initial adhesivity.

The average particle diameter of the dispersant in the (A-1) aqueous emulsion according to the present invention is not specifically limited but is desirably 0.5 to 2$\mu$m, more desirably 0.8 to 1.5$\mu$m. The concentration of the dispersoid in the (A-1) aqueous emulsion may be suitably determined according to the various situations, but is desirably 40 to 60% by weight, more desirably 45 to 55% by weight. The concentration of the dispersant in the (A-1) aqueous emulsion is not specifically limited as well but is desirably 0.2 to 50 parts by weight, more desirably 1 to 10 parts by weight per 100 parts by weight of the dispersoid.

As described hereinbefore, the dispersoid in the (A-1) aqueous emulsion according to the present invention forms the specific double layer structure. In the case, however, where a double layer structure is not formed or in spite of a double layer structure being formed, the polymer (1) is present principally in the peripheral part of the dispersoid and the copolymer (2) is present principally in the central part thereof, the aqueous emulsion is poor in stability and further fails to develop sufficient water resistance when used in an adhesive.

In the (A-1) aqueous emulsion according to the present invention, the foregoing dispersoid is stabilized in aqueous emulsion by the dispersant comprising the PVA. To the (A-1) aqueous emulsion, if necessary, different types of aqueous emulsions may be added and exemplified by vinyl acetate, ethylene/vinyl acetate copolymer, polychloroprene, polybutadiene, styrene/butadiene copolymer, butadiene/acrylonitrile copolymer, butyl rubber, polyacrylic acid ester, polyvinyl chloride and polyvinylidene each in the form of emulsion.

On the other hand, the (A-2) aqueous emulsion comprises, as described hereinbefore, the dispersoid and dispersant. The aforementioned dispersoid comprises a copolymer containing as constitutional units, at least one hydrophobic unsaturated monomer unit selected from the group consisting of methacrylic ester monomer unit, acrylic ester unit, styrenic monomer unit, diene monomer unit and halogenated unsaturated monomer unit; and a primary hydroxyl group-containing ethylenically unsaturated monomer unit.

Here, the methacrylic ester monomer unit and acrylic ester monomer unit include each a variety of species and are preferably exemplified by those in the case of the above-described (A-1) aqueous emulsion.

Examples of the styrenic monomer unit include a wide diversity of species, among which are preferably units derived from styrene, $\alpha$-methylstyrene, p-methylstyrene, o-methylstyrene, p-styrenesulfonic acid and an alkali salt thereof such as sodium salt and potassium salt.

Examples of the diene monomer unit include a large variety of species, among which are preferably units derived from butadiene, isoprene, chloroprene and neoprene.

Examples of the halogenated unsaturated monomer unit include a variety of species, among which are preferably units derived from vinyl chloride, vinylidene chloride, vinyl bromide and vinylidene bromide.

The primary hydroxyl group-containing ethylenically unsaturated monomer unit in the (A-2) aqueous emulsion includes a variety of species and is preferably exemplified by those in the case of the above-described (A-1) aqueous emulsion.

The aforementioned at least one hydrophobic unsaturated monomer unit selected from the group consisting of methacrylic ester monomer unit, acrylic ester monomer unit, styrenic monomer unit, diene monomer unit and halogenated unsaturated monomer unit, and primary hydroxyl group-containing ethylenically unsaturated monomer unit may contain one member or at least two members in combination, respectively.

The above-mentioned copolymer which constitutes the dispersoid of the (A-2) aqueous emulsion of the present invention indispensably comprises the aforesaid hydrophobic unsaturated monomer unit and primary hydroxyl group-containing ethylenically unsaturated monomer unit, and may contain, in addition to the aforestated monomer units, a copolymerized monomer unit exemplified by vinyl ester monomer unit such as those derived from vinyl acetate, vinyl formate, vinyl versate and vinyl pivalate, mono-olefinic monomer unit such as ethylene and propylene and nitrile monomer unit such a acrylonitrile and methacrylonitrile to the extent that the addition thereof does not impair the effect of the present invention.

The content of the above-mentioned copolymerized monomer unit in the copolymer is desirably 20% or less by weight, more desirably 10% or less by weight.

The content of the primary hydroxyl group-containing ethylenically unsaturated monomer unit in the copolymer constituting the dispersoid in the (A-2) aqueous emulsion according to the present invention is indispensably 0.1 to 50% by weight, desirably 0.2 to 15% by weight, more desirably 0.5 to 10% by weight.

An unreasonably low content of the primary hydroxyl group-containing ethylenically unsaturated monomer unit decreases the effect on the crosslinkage with the polyvalent isocyanate compound as the component (B), thus failing to sufficiently develop water resistance required for the adhesive obtained therefrom. Conversely, an excessively high content thereof unreasonably increases the hydrophilic nature of the copolymer constituting the dispersoid, thereby decreases the polymerization stability at the time of emulsion polymerization and water resistance of the aqueous emulsion itself, resulting in failure to sufficiently develop water resistance required for the adhesive to be made from the aqueous emulsion.

The content of the hydrophobic unsaturated monomer unit in the copolymer is desirably 50 to 99.9% by weight, more desirably 85 to 99.8% by weight, furthermore desirably 90 to 99.5% by weight.

The glass transition temperature (Tg) of the copolymer which constitutes the dispersoid in the (A-2) aqueous emulsion according to the present invention is not specifically limited, but is desirably not lower than −10° C. to lower than 50° C., more desirably from −10° C. to 40° C. A Tg of lower than −10° C. may decrease the adhesive strength on account of insufficient cohesive force, while a Tg of 50° C. or higher may deteriorate the film-forming properties resulting in decrease in the adhesive strength.

The (A-2) aqueous emulsion according to the present invention, as described hereinbefore, comprises the aforestated dispersoid and dispersant, which comprises PVA having a mercapto group at an end thereof. Such PVA as above may be chemically bonded to the copolymer of the dispersoid by graft reaction or may be physically adsorbed on the copolymer of the dispersoid, but the former chemical bonding is preferable.

Although the use of a PVA having a mercapto group in the main chain thereof instead of at an end thereof can develop the effect to some extent, the use thereof is not desirable because of possibility of insolubilization due to the formation of disulfide bond by the oxidation of PVA itself. Therefore, in the (A-2) aqueous emulsion according to the present invention, there should be used the PVA having a mercapto group at an end thereof, preferably the PVA having a mercapto group at one end only thereof, since the use of the latter can eliminate the fear of insolubilization and facilitate the handling thereof. The PVA having a mercapto group at an end thereof to be used in the present invention may have a different functional group in the main or side chain of the PVA in addition to the mercapto group at an end thereof.

The aforesaid PVA having a mercapto group at one end only thereof can be prepared for example, by hydrolyzing a vinyl ester polymer obtained by polymerizing, in the presence of a thiolic acid, a vinyl monomer comprising a vinyl ester monomer as primary component.

The degree of polymerization of the PVA having a mercapto group at an end thereof to be used in the present invention may be determined according to respective situations without specific limitation, but is desirably 3500 or less, more desirably 1500 or less. The degree of hydrolysis thereof depends on the type of the other modifying group and can not be unequivocally determined, but is desirably not less than 70 mol% from the viewpoint of water-solubility. The dispersant may be composed of the PVA having a mercapto group at an end thereof alone but may contain, in addition to the above, a known PVA or an emulsifying agent other than PVA to the extent that the addition thereof does not injure the emulsion polymerization stability or initial adhesivity.

By virtue of the high activity of the mercapto group in radical reaction, the PVA having a mercapto group at an end thereof can be highly reactive even with a monomer having a relatively low radical reactivity such as methacrylic ester monomer, acrylic ester monomer, styrenic monomer, diene monomer and halogenated unsaturated monomer which have been extremely difficult to be made into a stable emulsion by the use of the conventional PVA not having a mercapto group at an end thereof as the dispersant. As a result, the PVA having a mercapto group at an end thereof can be chemically bonded to the particles of the dispersoid composed of the copolymer comprising any of the aforementioned monomers as the constitutional unit, thereby providing an exceptionally stable aqueous emulsion.

The average particle diameter of the dispersoid in the (A-2) aqueous emulsion according to the present invention is not specifically limited but is desirably 0.2 to 2.0μm, more desirably 0.3 to 1.5μm. The concentration of the dispersoid in the (A-2) aqueous emulsion may be suitably determined according to the various situations, but is desirably 30 to 70% by weight, more desirably 40 to 60% by weight. The concentration of the dispersant in the (A-2) aqueous emulsion is not specifically limited as well but is desirably 0.5 to 30 parts by weight, more desirably 1 to 10 parts by weight per 100 parts by weight of the dispersoid. In the case where the average particle diameter, concentration of the dispersoid or the concentration of the dispersant departs from the foregoing desirable range in the (A-2) aqueous emulsion of the present invention, polymerization stability at the time of emulsion polymerization and water resistance, durability and initial adhesivity of the adhesive obtained from the aqueous emulsion may not be developed with favorable balance among them.

To the (A-2) aqueous emulsion of the present invention, if necessary, different types of aqueous emulsions may be added to the extent that the addition thereof does not impair the performance such as water resistance and initial adhesivity, which emulsions are exemplified by those described in the case of the foregoing (A-1) aqueous emulsion.

As described hereinbefore, the composition according to the present invention comprises an (A) aqueous emulsion and a (B) polyvalent isocyanate compound, which possesses at least two isocyanate groups in a molecule and is enumerated by tolylene diisocyanate (TDI); hydrogenated TDI; trimethylol propane-TDI adduct (e.g. produced by Bayer AG under the tradename "Desmodur L"); triphenylmethane triisocyanate; methylenebis(diphenyl isocyanate) (MDI); hydrogenated MDI; polymerized MDI; hexamethylene diisocyante; xylylene diisocyanate; 4,4-dicyclohexylmethane diisocyanate; and isophorone diisocyanate. There may be also used a prepolymer having an isocyante group at an end thereof which is obtained by preliminarily polymerizing a polyol with excessive polyisocyanate.

The compounding ratio of the (A) aqueous emulsion to the (B) polyvalent isocyanate compound, together constituting the foregoing composition of the present invention, may be suitably determined according to the various conditions, but is desirably 10 to 150 parts by weight, more desirably 20 to 100 parts by weight of (B) polyvalent isocyanate compound per 100 parts by weight of (A) aqueous emulsion expressed in terms of solid content.

The composition according to the present invention comprises (A-1) aqueous emulsion in which is contained PVA as the dispersant or (A-2) aqueous emulsion in which is contained PVA having a mercapto group at an end thereof as the dispersant, and according to the demand, a known PVA may be added to either of the PVA in (A-1) aqueous emulsion and the PVA in (A-2) aqueous emulsion.

The composition according to the present invention may be incorporated, if necessary, with starch, denatured starch, oxidized starch, sodium alginate, carboxymethyl cellulose, methyl cellulose, hydroxymethyl cellulose, maleic anhydride/isobutene copolymer, maleic anhydride/styrene copolymer, water-soluble high molecular compound such as maleic anhydride/methylvinyl ether copolymer and a thermosetting resin such as urea/formalin resin, urea/melamine/formalin resin and phenol/formalin resin, each resin being generally used in an adhesive.

In addition, the composition according to the present invention may be incorporated as required with a filler such as clay, kaoline, talc, calcium carbonate and wood powder; extender such as wheat flour; reaction accelerator such as boric acid and aluminum sulfate; pigment such as titanium oxide; and various additives such as preservative and rust preventive.

The adhesive of the present invention is used for joining a variety of objects and above all for joining wood and lumber.

The coating amount of the adhesive of the present invention is desirably 20 to 300 g/m$^2$, more desirably 30 to 200 g/m$^2$ expressed in terms of solid content.

As the method for coating, brush coating, roll coating and the like are available. As the method for drying after coating of the adhesive, drying at room temperature to 200° C. is acceptable, but the adhesive of the present invention develops a sufficient adhesive force even after drying at room temperature.

The adhesive of the present invention is characterized in that it is excellent in both initial adhesivity and water resistance in boiling water. The drying time after coating is desirably 30 minutes to 5 hours, preferably under press bonding. The pressure required for the press bonding is determined in the range of 5 to 20 kg/cm$^2$, preferably higher in the case where the object to be joined is a hard wood or lumber and preferably higher, so far as the object is not broken, in the case where the object to be joined is a soft wood or lumber.

The wooden product according to the present invention is a wooden product joined with the above-described adhesive, including plywood, furniture and the like, each joined with the adhesive. The kinds of wood in the wooden product is not specifically limited and is exemplified by birch, (Japanese) hemlock, (Japanese) cedar, lauan, zelkova tree and the like.

For the production of the above-described (A-1) aqueous emulsion or (A-2) aqueous emulsion according to the present invention, various processes are taken into consideration, among which a process for efficiently producing a high quality aqueous emulsion will be described as follows:

The desirable process for producing (A-1) aqueous emulsion is the two-step polymerization process comprising the first step wherein a vinyl ester monomer is subjected to emulsion polymerization in the presence of a PVA as the dispersant to produce the vinyl ester polymer (1) ; and the second step in which a (meth)acrylic ester monomer and a primary hydroxyl group-containing ethylenically unsaturated monomer are subjected to emulsion polymerization to produce the above-described copolymer (2) around the vinyl ester polymer already formed in the preceding first step.

The polymerization of the vinyl ester monomer is desirably completed substantially in the first step of the process, which however may be transferred to the second step after about 70% conversion to the polymer. It is not always necessary to effect polymerization in the first and second steps in the same polymerization reactor, but the polymer may be produced by means of seed polymerization process in which an aqueous emulsion of a vinyl ester polymer is separately produced in advance and added to the reaction system prior to the start of emulsion copolymerization of a (meth)acrylic ester monomer and a primary hydroxyl group-containing ethylenically unsaturated monomer. The polymerization initiator to be used for the emulsion polymerization is not specifically limited but is preferably a water-soluble initiator such as an oxidative substance exemplified by hydrogen peroxide, cumene hydroperoxide, tert-butyl hydroperoxide, persulfate (salt of potassium, sodium or ammonium), tert-butyl peracetate and tert-butyl, perbenzoate; a reductive substance exemplified by Rongalite and 1-ascorobic acid.

In the two-step polymerization process according to the present invention, it is necessary to carry out the first and second steps of emulsion polymerization in the presence of a dispersant comprising PVA. In the case where PVA is not used as a dispersant, the aqueous emulsion obtained is inferior in initial adhesivity when used as an adhesive, thereby failing to attain the object of the present invention. The PVA to be used in the two-step polymerization process is the same as that described in the (A) aqueous emulsion according to the present invention.

The amount of PVA to be used is not specifically limited, but is in the range of 0.2 to 50% by weight, desirably 1 to 10% by weight based on the total amount of the polymer (1) in the first step and the copolymer (2) in the second step. The PVA may be added to the reaction system in whole at the initial feeding or may be added thereto in part continuously or intermittently. In addition, a known emulsifying agent other than PVA may be used in combination with PVA insofar as the use thereof does not impair the performance of the adhesive such as initial adhesivity.

The vinyl ester monomer to be used in the first step of the two-step polymerization process according to the present invention constitutes the starting raw material for the above-mentioned vinyl ester polymer (1) therefore the type of the monomer is desirably correspondent to the type of the vinyl ester polymer (1) to be obtained therefrom.

The (meth)acrylic ester monomer and primary hydroxyl group-containing ethylenically unsaturated monomer to be used in the second step of the two-step polymerization together constitute the starting raw material for the aforestated copolymer (2), thus the types and the proportion to be used is desirably correspondent to the type and composition of the copolymer to be obtained therefrom.

The ratio by weight of the vinyl ester polymer (1) to be produced in the first step to the copolymer (2) to be produced in the second step is desirably determined so that the above ratio corresponds to the ratio by weight of the polymer (1) to the copolymer (2) in the (A-1) aqueous emulsion according to the present invention.

The desirable process for producing (A-2) aqueous emulsion is the process which comprises emulsion-polymerizing at least one hydrophobic unsaturated monomer selected from the group consisting of methacrylic ester monomer, acrylic ster monomer, styrenic monomer, diene monomer and halogenated unsaturated monomer and 0.1 to 50% by weight of a primary hydroxyl group-containing ethylenically unsaturated monomer based on the total amount of the aforementioned monomer in the presence of PVA having a mercapto group at an end thereof.

In putting the above-mentioned process into practice, there is available the conventional emulsion polymerization method in which the aforesaid monomer is added to the reaction system at a time or continuously followed by heating and stirring in the presence of water, said PVA and a polymerization initiator. There is also available the method in which a preliminarily emulsified mixture of a monomer and the aqueous solution of said PVA is continuously added to the reaction system.

As the polymerization initiator to be used in the aforesaid process, there is available a Redox system comprising the terminal mercapto group of a PVA having a mercapto group at an end thereof and a water-soluble oxidizing agent such as potassium bromate, potassium persulfate, ammonium persulfate and hydrogen peroxide. Among them potassium bromate is a particularily desirable polymerization initiator since it does not generate a radical independently under usual polymerization conditions, but is decomposed only by the Redox reaction with the terminal mercapto group of a PVA having a mercapto group at an end thereof to generate a radical, thereby effectively producing a block copolymer with the PVA having a mercapto group at an end thereof with the result that the stability of the aqueous emulsion is enhanced. It is also possible to use an oxidizing agent in combination, that is, to use potassium bromate at the start of polymerization and thereafter add another oxidizing agent.

It is particularly desirable that the polymerization system is acid in the case of emulsion (co)polymerization in the presence of the PVA having a mercapto group at an end thereof. The reason for the above is that under alkaline condition, the mercapto group which exhibits an extremely active reactivity at the time of radical polymerization increases the velocity of ionically adding to the double bond of a hydrophobic unsaturated monomer, resulting in a marked decrease in polymerization efficiency. Accordingly, the pH in the polymerization system depends on the type of the hydrophobic unsaturated monomer, but is desirably 6 or less, particularly desirably 4 or less for all of the emulsion polymerization operations to be carried out according to the process of the present invention.

The composition of the present invention finds a wide diversity of use typified by adhesive. The use of the composition as an adhesive can drastically improve initial adhesivity as well as adhesive strength and water resistance. The adhesive according to the present invention is applicable for joining miscellaneous objects, particularly favorably for joining wooden products, and also can be used for joining not only two or more woods but also wood to paper, fiber product, inorganic board, and the like.

By virtue of its adhesive film excellent in water resistance, the composition of the present invention can find effective use in the field of inorganic binder, primer for inorganic board, wooden panel and the like.

In the following, the present invention will be described in more detail with reference to the examples and comparative examples, wherein "part(s)" and "%" denote part(s) by weight and % by weight, respectively, unless otherwise specified.

EXAMPLE 1

(1) First step

In an autoclave equipped with a stirrer, a nitrogen introduction pipe and a chemicals injection pump, 4 parts of partially hydrolyzed PVA having an average degree of polymerization of 1700 and a degree of hydrolysis of 88 mol% was dissolved in 85 parts of ion-exchanged water with heating, 6 parts of vinyl acetate was added therein, after atmosphere in the autoclave was replaced with nitrogen the mixture was heated to raise the temperature to 70° C, polymerization was initiated by the use of 0.06 part of 1% hydrogen peroxide aqueous solution and 0.03 part of 5% Rongalite aqueous solution, and 54 parts of vinyl acetate was continuously added in the autoclave over a period of 2 hours, during which 0.54 part of 1% hydrogen peroxide aqueous solution and 0.3 part of 5% Rongalite aqueous solution were continuously added therein. At the time when the concentration of the residual vinyl acetate in the polymerization system decreased to 3%, a sample was collected for Tg measurement.

(2) Second step

Subsequently, a monomer mixture of methyl methacrylate (MMA)/butyl acrylate (BA)/2-hydroxyethyl methacrylate (HEMA) in a ratio by weight of 21/16/3 was continuously added in the autoclave over a period of 2 hours, during which period 4 parts of 1% hydrogen peroxide aqueous solution and 2.0 parts of 5% Rongalite aqueous solution were continuously added therein.

In the course of the polymerization 1.0 part of PVA same as that used in the first step as 15% aqueous solution was added therein over a period of 1.5 hour.

The aqueous emulsion thus obtained had a solid concentration of 52.0% and a viscosity of 2350 mPas.s (milliPascal.second).

Separately, copolymerization was carried out at a composition by weight of MMA/BA/HEMA = 21/16/3 to measure Tg of the resultant copolymer.

As a result of analysis by differential scanning calorimetry (DSC), the Tg was 30° C. for the polymer in the first step and 15° C. for the copolymer in the second step. The ratio by weight of the polymer in the first step to the copolymer in the second step was 60:40.

(3) Adhesion test

By the use of the aforesaid aqueous emulsion, adhesion test was carried out under the following conditions. The result are given in Table 1.

Conditions of adhesion test

Adhesive composition

The adhesive to be tested was obtained by adding 45 parts of 10% PVA aqueous solution having a degree of polymerization of 1700 and a degree of hydrolysis of 98 mol% (produced by Kuraray Co., Ltd. under the tradename "PVA 117") and 10 parts of calcium carbonate to 45 parts of said aqueous emulsion, and to the resultant mixture further adding 15 parts of polymethylene polyphenyl isocyanate (produced by Nippon Polyurethane Industry Co., Ltd. under the tradename "Millionate MR-100") followed by mixing.

Adhesion conditions

Object to be joined: birch/birch (grain face) with 8% water content
Coating amount : 250 g/m² (for both sides)
Open time : 1 min.
Pressure bonding condition: 20° C., 24 hours, 10 kg/cm² pressure (only for test pieces for dry strength and for ones for repeated boiling)

Measuring condition

Compression-shear adhesive strength was measured according to JIS K-6852

Dry strength: After curing at 20° C. for 7 days, measured as such.

Repeated boiling: after curing at 20° C. for 7 days, a test piece was immersed in boiling water for 4 hours, then dried in the air at 60° C. for 20 hours, again immersed in boiling water for 4 hours, allowed to stand in the water until the boiling water cools to room temperature and subjected to the test as such under wet condition.

Initial adhesivity: A pair of test pieces was stuck together, subjected to press bonding at 20° C. and 10 kg/cm² and immediately thereafter measured for compression-shear adhesive strength.

EXAMPLE 2

(1) First step

In the autoclave which was used in Example 1, 4 parts of partially hydrolyzed PVA having an average degree of polymerization of 500 and a degree of hydrolysis of 88 mol% (produced by Kuraray Co., Ltd. under the tradename "PVA 205") was dissolved in 85 parts of ion-exchanged water, 8 parts of vinyl acetate was added therein, and under a pressure of 40 kg/cm² by ethylene at 60° C. potassium persulfate and aqueous solution of Rongalite were added therein to initiate polymerization. The amount of the polymerization initiator was adjusted so as to attain an appropriate polymerization rate in the same manner as in Example 1, (The same procedure was applied to the Examples described hereinafter).

Subsequently 36 parts vinyl acetate was continuously added in the autoclave over a period of 3 hours and the polymerization was continued until the concentration of the vinyl acetate monomer reached 4%.

(2) Second step

Subsequently, a monomer mixture of MMA/2-ethylhexyl acrylate (2-EHA)/2-hydroxyethyl acrylate (HEA) in a ratio by weight of 28/15/2 was continuously added in the autoclave over a period of 2 hours to proceed with polymerization, during which period 1.0 part of the same PVA as that used in the first step as 15% aqueous solution was added therein.

The aqueous emulsion thus obtained had a solid concentration of 51.5% and a viscosity of 1010 mPas.s.

As the result of analysis by DSC, the Tg showed 0° C. for the polymer in the first step, and 15° C. for the copolymer in the second step. The ratio by weight of the polymer in the first step to the copolymer in the second step was 55:45.

(3) Adhesion test

By the use of the aforementioned aqueous emulsion, adhesion test was carried out in the same manner as in Example 1. The results are given in Table 1.

COMPARATIVE EXAMPLE 1

In the same manner as in Example 2, (co)polymerization was effected in the first and second steps except that polyoxyethylene nonylphenyl ether having 40 mol of oxyethylene units (produced by Sanyo Chemical Industries, Ltd. under the tradename "Nonipol 400") was used in place of PVA.

As a result, the Tg of the polymer in the first step went down to −3° C., presumably because of the plasticizing effect of the above-mentioned nonionic surfactant.

The aqueous emulsion thus obtained had a solid concentration of 50.9% and a viscosity of 100 mPas.s. The ratio by weight of the polymer n the first step to the copolymer in the second step was 55:45.

By the use of the aforesaid aqueous emulsion, adhesion test was carried out in the same manner as in Example 1. The results are given in Table 1.

COMPARATIVE EXAMPLE 2

In the autoclave which was used in Example 1, 4 parts of partially hydrolyzed PVA having an average degree of polymerization of 1700 and a degree of hydrolysis of 88 mol% (produced by Kuraray Co., Ltd. under the tradename "PVA 217") was dissolved in 85 parts of ion-exchanged water with heating, and then 20 parts of a monomer mixture of vinyl acetate (VAc)/MMA/BA/HEMA in a ratio by weight of 60/21/16/3 was added therein, followed by adding aqueous solution of potassium persulfate at 70° C. to initiate polymerization. Further, the balance 80 parts of the monomer mixture was continuously added therein over a period of 3 hours along with the continuous addition of 1.0 part of PVA as 15% aqueous solution. At the last stage of polymerization, however, the reaction was uncontrollably abnormalized to produce a large amount of agglomerate in the autoclave.

EXAMPLE 3

(1) First step

In the autoclave was placed 60 parts of ion-exchanged water, in which was dissolved 3 parts of partially hydrolyzed PVA having an average degree of polymerization of 500 and a degree of hydrolysis of 88 mol% (produced by Kuraray Co., Ltd. under the tradename "PVA 205") and to the aqueous solution were added 10 parts of monomer mixture of VAc/vinyl versate (produced by Shell Chemical Co., Ltd. under the tradename "Veova 10") in a ratio by weight of 29/21 and aqueous solution of potassium persulfate at 70° C. to initiate polymerization. Further, 40 parts of the monomer mixture was continuously added over a period of 2 hours, and polymerization was continued until the concentration of the monomer mixture dropped as low as 0.5%.

(2) Second step

In another reactor preliminarily containing a solution of 2 parts of the aforesaid PVA in 25 parts of ion-exchanged water was fed the total amount of the aqueous emulsion of the VAc/vinyl versate copolymer as obtained in the first step. Subsequently, 10 parts of a monomer mixture of MMA/BA in a ratio by weight of 31/16 was added therein, polymerization was initiated by the use of potassium persulfate at 70° C., and 40 parts of the above monomer mixture and 20% aqueous solution of 3 parts of N-methylolacrylamide (N-MAM) were continuously added therein over a period of 2 hours. The aqueous emulsion thus obtained had a solid concentration of 49.5% and a viscosity of 960 mPas.s.

The Tg showed 15° C. for the polymer in the first step and 30° C. for the copolymer in the second step. The ratio by weight of the polymer in the first step to the copolymer in the second step was 50:50.

By the use of the aforestated aqueous emulsion, adhesion test was carried out in the same manner as in Example 1. The results are given in Table 1.

EXAMPLE 4

(1) First step

In a pressure resistant autoclave, 3 parts of PVA as used in Example 2 was dissolved in 85 parts of ion-exchanged water, 18 parts of vinyl acetate and 18 parts of vinyl chloride were added therein, ethylene was introduced therein to show the pressure of 35 kg/cm$^2$ at 60° C., and polymerization was initiated by the use of hydrogen peroxide and aqueous solution of Rongalite. After 3 hours, when the concentration of vinyl acetate in the polymerization system went down as low as 0.5%, the reaction product was taken out from the system. The polymer had a Tg of 35° C.

(2) Second step

Subsequently, the aforesaid aqueous emulsion was transferred to a reaction kettle at atmospheric pressure, in which were placed 10 parts of monomer mixture of MMA/styrene (St)/2-EHA/HEMA in a ratio by weight of 18.5/18/22/1.5 and aqueous solution of potassium persulfate to initiate polymerization at 70° C. Then to the polymerization system was continuously added 51.5 parts of said monomer mixture over a period of 3 hours and was further added 15% aqueous solution of 2 parts of PVA over a period of 2 hours during the course of polymerization. The copolymer produced in the second step had a Tg of 15° C. The aqueous emulsion thus obtained had a solid concentration of 50.8% and a viscosity of 850 mPas.s. The ratio by weight of the polymer in the first step to the copolymer in the second step was 40:60.

By the use of the aqueous emulsion thus formed, adhesion test was carried out in the same manner as in Example 1. The results are given in Table 1.

EXAMPLE 5

(1) First step 3 parts of the same PVA as that used in Example 1 was dissolved in 85 parts of ion-exchanged water, 72 parts of vinyl acetate was added to the solution and ethylene was introduced to show the pressure of 30 kg/cm$^2$ at 50° C. Polymerization was conducted by the use of hydrogen peroxide and aqueous solution of Rongalite. After 2 hours the concentration of the vinyl acetate in the polymerization system dropped as low as 2%.

(2) Second step

Subsequently a monomer mixture of MMA/2-EHA/HEA in a ratio by weight of 11.6/6.4/2.0 was added to the system to continue polymerization. The aqueous emulsion thus obtained had a solid concentration of 51.0% and a viscosity of 300 mPas.s.

The Tg showed 10° C. for the polymer obtained in the first step and 15° C. for the copolymer formed in the second step. The ratio by weight of the polymer in the first step to the copolymer in the second step was 80:20.

By the use of the aforestated aqueous emulsion, adhesion test was carried out in the same manner as in Example 1. The results are given in Table 1.

COMPARATIVE EXAMPLE 3

(1) First step 4 parts of the same PVA as that used in Example 2 (an average degree of polymerization of 500 and a degree of hydrolysis of 88 mol%) was dissolved in 85 parts of ion-exchanged water, 74 parts of vinyl acetate was added to the solution and ethylene was introduced to show the pressure of 40 kg/cm$^2$ at 60° C. Then polymerization was carried out by the use of hydrogen peroxide and aqueous solution of Rongalite. After 3 hours the concentration of vinyl acetate in the system dropped as low as 1%.

(2) Second step

Subsequently, total amount of a monomer mixture of MMA/BA/HEA in a ratio by weight of 3.5/2.5/2.0 was added to the system to continue polymerization, during which 1.0 part of the same PVA as above was added to the system as 10% aqueous solution.

The aqueous emulsion thus obtained had a solid concentration of 49.6% and a viscosity of 2500 mPas.s.

The Tg showed 0° C. for the polymer obtained in the first step and 15° C. for the copolymer formed in the second step. The ratio by weight of the polymer in the first step to the copolymer in the second step was 92:8.

By the use of the aforestated aqueous emulsion, adhesion test was carried out in the same manner as in Example 1. The results are given in Table 1.

COMPARATIVE EXAMPLE 4

(1) First step 0.5 part of the same PVA as that used in Example 2 was dissolved in 20 parts of ion-exchanged water, 4 parts of vinyl acetate was added to the solution and ethylene was introduced to show the pressure of 40 kg/cm$^2$ at 60° C. Then polymerization was carried out by the use of hydrogen peroxide and aqueous solution of Rongalite. After 0.5 hour the concentration of vinyl acetate in the system dropped as low as 1% or lower.

(2) Second step

Subsequently, a monomer mixture of MMA/BA/-HEA in a ratio by weight of 52.9/40.1/2 was added to the system to conduct copolymerization, during which aqueous solution of 4.5 parts of the same PVA as above in 65 parts of ion-exchanged was added to the system.

The aqueous emulsion thus obtained contained coarse particles and after filtration, had a solid concentration of 48.0% and a viscosity of 620 mPas.s.

The Tg showed 0° C. for the polymer obtained in the first step and 15° C. for the copolymer formed in the second step. The ratio by weight of the polymer in the first step to the copolymer in the second step was 5:95.

By the use of the aforestated aqueous emulsion, adhesion test was carried out in the same manner as in Example 1. The results are given in Table 1.

COMPARATIVE EXAMPLE 5

(1) First step 3.0 parts of the same PVA as that used in Example 2 was dissolved in 85 parts of ion-exchanged water, 45 parts of vinyl acetate was added to the solution and ethylene was introduced to show the pressure of 40 kg/cm$^2$ at 60° C. Then polymerization was carried out by the use of hydrogen peroxide and aqueous solution of Rongalite. After 3 hours the concentration of vinyl acetate in the system dropped as low as 2%.

(2) Second step

Subsequently, 5 parts of a monomer mixture of MMA/BA/HEMA in a ratio by weight of 29.6/7.4/3 was added to the system to conduct polymerization at 70° C. and 38 parts of the above monomer mixture was further added over a period of 2 hours during which 2 parts of the same PVA as above was added to the system as 15% aqueous solution.

The aqueous emulsion thus obtained had a solid concentration of 50.2% and a viscosity of 1260 mPas.s.

The Tg showed 0° C. for the polymer obtained in the first step and 55° C. for the copolymer formed in the second step. The ratio by weight of the polymer in the first step to the copolymer in the second step was 60:40.

By the use of the aforestated aqueous emulsion, adhesion test was carried out in the same manner as in Example 1. The results are given in Table 1.

COMPARATIVE EXAMPLE 6

The procedure in Example 2 was repeated to conduct polymerization in the first step and copolymerization in the second step except that in the second step a monomer mixture of MMA/2-EHA in a ratio by weight of 29/16 without HEA was used in place of MMA/2-EHA/HEA.

The aqueous emulsion thus obtained had a solid concentration of 48.9% and a viscosity of 1800 mPas.s.

The Tg showed 0° C. for the polymer obtained in the first step and 14° C. for the copolymer formed in the second step. The ratio by weight of the polymer in the first step to the copolymer in the second step was 55:45.

By the use of the aforestated aqueous emulsion, adhesion test was carried out in the same manner as in Example 1. The results are given in Table 1.

COMPARATIVE EXAMPLE 7

In the same autoclave as that used in Example 1, 3 parts of the same PVA as that used in Example 2 was dissolved in 85 parts of ion-exchanged water with heating, then 4 parts of a monomer mixture of MMA/BA/HEMA in a ratio by weight of 21/16/3 was added to the solution, aqueous solution of potassium persulfate was added thereto to initiate polymerization at 70° C. and further 36 parts of the above monomer mixture was continuously added to the polymerization system over a period of 3 hours.

Thereafter 60 parts of vinyl acetate and 2 parts of PVA as 15% aqueous solution were continuously added to the system over a period of 3 hours, but a large amount of agglomerate was formed in the autoclave, failing to produce favorable aqueous emulsion. The results are given in Table 1.

TABLE 1

| | Aqueous emulsion | | | | | | | |
|---|---|---|---|---|---|---|---|---|
| | First step | | | | Second step | | | |
| | | | | | | Primary hydroxyl | | Weight ratio of first |
| | Amount of | Tg | | Tg | group-containing | | | step polymer/second |
| No. | PVA used*[1] | (C.°) | | Composition*[2] | (°C.) | monomer*[2] | | Composition | step copolymer |
| Example 1 | PVA 217 | 5.0 | 30 | VAc | 15 | HEMA | 3.0 | MMA/BA | 60/40 |
| Example 2 | PVA 205 | 5.0 | 0 | Et/VAc | 15 | HEA | 2.0 | MMA/2-EHA | 55/45 |
| Example 3 | PVA 205 | 5.0 | 15 | VAc/Veova | 30 | N-MAM | 3.0 | MMA/BA | 50/50 |
| Example 4 | PVA 205 | 5.0 | 35 | Et/VAc/VCl | 10 | HEMA | 1.5 | St/MMA/2-EHA | 40/60 |
| Example 5 | PVA 205 | 3.0 | 10 | Et/VAc | 15 | HEA | 2.0 | MMA/2-EHA | 80/20 |
| Comparative Example 1 | Nonipol 400 | 5.0 | −3 | Et/VAc | 15 | HEA | 2.0 | MMA/2-EHA | 55/45 |
| Comparative Example 2 | PVA 217 | 5.0 | 15 | VAc/MMA/BA/HEMA | — | — | — | — | 100/0 |
| Comparative Example 3 | PVA 205 | 5.0 | 0 | Et/VAc | 15 | HEA | 2.0 | MMA/BA | 92/8 |
| Comparative Example 4 | PVA 205 | 5.0 | 0 | Et/VAc | 15 | HEA | 2.0 | MMA/BA | 5/95 |
| Comparative Example 5 | PVA 205 | 5.0 | 0 | Et/VAc | 55 | HEMA | 3.0 | MMA/BA | 60/40 |
| Comparative Example 6 | PVA 205 | 5.0 | 0 | Et/VAc | 14 | — | — | MMA/BA | 55/45 |
| Comparative Example 7 | PVA 205 | 5.0 | 15 | MMA/BA/HEMA | 30 | — | — | VAc | 40/60 |

| | Aqueous emulsion Properties of aqueous emulsion finally obtained | | | Adhesion performance of adhesive*[3] | | | | | |
|---|---|---|---|---|---|---|---|---|---|
| | | Concentra- | Brookfield viscosity | Dry strength | | Repeated boiling strength | | Initial adhesive strength | |
| No. | Stability | tion (%) | at 30° C. (mPa · s) | (kg/cm$^2$) | (%) | (kg/cm$^2$) | (%) | (kg/cm$^2$) | (%) |
| Example 1 | Good | 52.0 | 2,350 | 230 | (60) | 120 | (40) | 70 | (0) |

TABLE 1-continued

| | | | | | | | | | | | |
|---|---|---|---|---|---|---|---|---|---|---|---|
| Example 2 | Good | 51.5 | 1,010 | 250 | (90) | 150 | (70) | 80 | (0) |
| Example 3 | Good | 49.5 | 960 | 210 | (60) | 140 | (30) | 75 | (0) |
| Example 4 | Good | 50.8 | 850 | 240 | (70) | 150 | (50) | 65 | (0) |
| Example 5 | Good | 51.0 | 300 | 215 | (80) | 100 | (15) | 80 | (0) |
| Comparative Example 1 | Good | 50.9 | 100 | 190 | (40) | 110 | (20) | 20 | (0) |
| Comparative*4 Example 2 | Unstable | — | — | — | — | — | — | — | — |
| Comparative Example 3 | Good | 49.6 | 2,500 | 210 | (70) | 80 | (0) | 50 | (0) |
| Comparative*5 Example 4 | Unstable | 48.0 | 620 | 150 | (10) | 85 | (0) | 15 | (0) |
| Comparative Example 5 | Good | 50.2 | 1,260 | 140 | (20) | 70 | (0) | 20 | (0) |
| Comparative Example 6 | Good | 48.9 | 1,800 | 220 | (60) | 60 | (0) | 55 | (0) |
| Comparative*4 Example 7 | Unstable | — | — | — | — | — | — | — | — |

*[1]amount in parts by weight per 100 parts by weight of solid content of aqueous emulsion finally obtained.
(1) PVA 217 - PVA having an average degree of polymerization of 1700 and a degree of hydrolysis of 88 mol % produced by Kuraray Co., Ltd.
(2) PVA 205 - PVA having an average degree of polymerization of 500 and a degree of hydrolysis of 88 mol % produced by Kuraray Co., Ltd.
*[2](1) VAc - vinyl acetate
(2) Et - ethylene
(3) Veova - Veova 10 (tradename, product of Shell Chemical Co., Ltd.)
(4) VCl - vinyl chloride
(5) MMA - methyl methacrylate
(6) HEMA - 2-hydroxyethyl methacrylate
(7) HEA - 2-hydroxyethyl acrylate
(8) N-MAM - N-methylolacrylamide
(9) BA - butyl acrylate
(10) 2-EHA - 2-ethylhexyl acrylate
(11) St - styrene
*[3]Figures in parenthesis denote wood breakage ratio in %.
*[4]Composition could not be prepared
*[5]Coarse particles formed in dispersion

EXAMPLE 6

(1) Preparation of aqueous emulsion

In a glass-made polymerization reactor equipped with a reflux condenser, a dropping funnel, a thermometer and a nitrogen injection nozzle were placed 5 parts of PVA having a mercapto group at an end thereof (average degree of polymerization of 550, degree of hydrolysis of 88.0 mol% and mercapto group (SH) content of $3.2 \times 10^{-5}$ equivalent/g) and 100 parts of ion-exchanged water, in which the PVA was completely dissolved at 95° C. The solution was adjusted to pH 3.0 with sulfuric acid, incorporated with 10 parts of methyl methacrylate and 10 parts of n-butyl acrylate, heated to 65° C. after atmosphere in the reactor was replaced with nitrogen, incorporated with 1.3 part of 2% potassium bromate aqueous solution to initiate polymerization and to the mixture were continuously added 40 parts of methyl methacrylate, 38 parts of n-butyl acrylate and 2 parts of 2-hydroxyethyl acrylate over a period of 2 hours. The polymerization was completed after 3 hours from the start thereof, producing a stable copolymer emulsion (I) of methyl methacrylate/n-butyl acrylate/2-hydroxyethyl acrylate having a solid concentration of 50.9%, a viscosity of 750 mPas.s and an average particle diameter of 0.9μm.

(2) Adhesion test

By the use of the aforementioned aqueous emulsion, adhesion test was carried out in the same manner as in Example 1. The results are given in Table 2.

EXAMPLE 7

(1) Preparation of aqueous emulsion

In a glass-made polymerization reactor equipped with a reflux condenser, a dropping funnel, a thermometer and a nitrogen injection nozzle were placed 5 parts of PVA having a mercapto group at an end thereof and a carboxyl group in the side chain thereof (average degree of polymerization of 700, degree of hydrolysis of 89.2 mol%, content of carboxyl group of 1.0 mol% and mercapto group (SH) content of $2.3 \times 10^{-5}$ equivalent/g) and 105 parts of ion-exchanged water, in which the PVA was completely dissolved at 95° C. The solution was adjusted to pH 3.0 with sulfuric acid, incorporated with 8 parts of styrene and 12 parts of 2-ethylhexyl acrylate, heated to 60° C. after atmosphere in the reactor was replaced with nitrogen, incorporated with 1.0 part of 2% potassium bromate aqueous solution to initiate polymerization and to the mixture were continuously added 32 parts of styrene, 45 parts of 2-ethylhexyl acrylate and 3 part of 2-hydroxyethyl methacrylate over a period of 2 hours. The polymerization was completed after 3 hours from the start thereof, producing a stable copolymer emulsion (II) of styrene/2-ethylhexyl acrylate/2-hydroxyethyl methacrylate having a solid concentration of 49.7%, a viscosity of 2800 mPas.s and an average particle diameter of 0.8μm.

(2) Adhesion test

By the use of the aforestated aqueous emulsion (II), adhesion test was carried out in the same manner as in Example 1. The results are given in Table 2.

EXAMPLE 8

(1) Preparation of aqueous emulsion

In a pressure resistant autoclave equipped with a nitrogen injection nozzle and a thermometer was placed 120 parts of 5% PVA aqueous solution having a mercapto group at an end thereof, said PVA being the same as that used in Example 6. By the use of sulfuric acid, the solution was adjusted to pH 4.0 and thereafter incorporated with 53 parts of styrene and 2 parts of 2-hydroxyethyl methacrylate. Subsequently, the autoclave was pressurized with 45 parts of butadiene through a metering pressure bottle. After raising the temperature of the contents in the autoclave to 70° C., 25 parts of 2% potassium persulfate aqueous solution was added into the autoclave to initiate polymerization. An internal pressure of 4.8 kg/cm² decreased with the progress of reaction and dropped to 0.5 kg after 20 hours.

The conversion to polymer was obtained as 98.5%.

The resultant copolymer emulsion (III) of styrene/butadiene/2-hydroxyethyl methacrylate was stable and had a solid concentration of 42.9%, a viscosity of 850 mPas.s and an average particle diameter of 1.1μm.

(2) Adhesion test

By the use of the aforestated aqueous emulsion (III), adhesion test was carried out in the same manner as in Example 1. The results are given in Table 2.

EXAMPLE 9

(1) Preparation of aqueous emulsion

In a pressure resistant autoclave equipped with a nitrogen injection nozzle and a thermometer was placed 120 parts of 5% PVA aqueous solution having a mercapto group at an end thereof, said PVA being the same as that used in Example 6. By the use of sulfuric acid, the solution was adjusted to pH 4.0 then after atmosphere in the autoclave was replaced with nitrogen, incorporated with 3 parts of 2-hydroxyethyl methacrylate. Subsequently, the autoclave was pressurized with 80 parts of vinyl chloride monomer through a metering pressure bottle. Thereafter the autoclave was pressurized with ethylene up to show the pressure of 30 kg/cm² and, after temperature raising to 60° C., 25 parts of 2% potassium persulfate aqueous solution was added. After 6 hours from the start of polymerization, the concentration of the residual vinyl chloride monomer dropped to 0.01% or lower, indicating the completion of polymerization. The vinyl chloride/ethylene copolymer emulsion (IV) thus obtained was stable and had a solid concentration of 43.3%, viscosity of 1000 mPas.s and an average particle diameter of 1.0μm.

(2) Adhesion test

By the use of the aforementioned aqueous emulsion (IV), adhesion test was carried out in the same manner as in Example 1. The results are given in Table 2.

COMPARATIVE EXAMPLE 8

The procedure in Example 6 was repeated to produce methyl methacrylate/n-butyl acrylate copolymer emulsion (V) except that the use of 2-hydroxyethyl acrylate containing primary hydroxy group was omitted. The aqueous emulsion thus obtained was stable and had a solid concentration of 50%, viscosity of 700 mPas.s and an average particle diameter of 0.9μm.

By the use of the aforementioned aqueous emulsion (V), adhesion test was carried out in the same manner as in Example 1. The results are given in Table 2.

COMPARATIVE EXAMPLE 9

The procedure in Example 6 was repeated except that an unmodified PVA having an average degree of polymerization of 500 and a degree of hydrolysis of 88 mol% (produced by Kuraray Co., Ltd. under the tradename "PVA 205") was used in place of the PVA having an mercapto group at an end thereof to try to effect emulsion polymerization of methyl methacrylate, n-butyl acrylate and 2-hydroxyethyl acrylate. However, after 30 minutes from the start of the trial coarse particles of several mm in size were formed at a conversion to polymer of 15.5%, thus failing to afford a stable aqueous emulsion.

COMPARATIVE EXAMPLE 10

The procedure in Example 8 was repeated except that an unmodified PVA having an average degree of polymerization of 500 and a degree of hydrolysis of 88 mol% (produced by Kuraray Co., Ltd. under the tradename "PVA 205") and an unmodified PVA having an average degree of polymerization of 1700 and an average degree of hydrolysis of 88 mol% (also produced by Kuraray Co., Ltd. under the tradename "PVA 217") in a ratio by weight of 8:2 were used in place of the PVA having an mercapto group at an end thereof to try to conduct emulsion polymerization of styrene, butadiene and 2-hydroxyethyl acrylate. However, after 2 hours from the start of the trial, blocking took place at a conversion to polymer of 25.3% thus failing to afford a stable aqueous emulsion.

COMPARATIVE EXAMPLE 11

The procedure in Example 7 was repeated except that a polyoxyethylene nonylphenyl ether having 40 mol of oxyethylene units (produced by Sanyo Chemical Industries, Ltd. under the tradename "Nonipol 400") was used in place of the PVA having a mercapto group at an end thereof and a carboxyl group in the side chain to obtain a styrene/2-ethylhexyl acrylate/2-hydroxyethyl methacrylate copolymer emulsion (VI). The emulsion thus obtained was stable and had a solid concentration of 49.8%, viscosity of 110 mPas.s and an average particle diameter of 0.15μm. By the use of the aqueous emulsion (VI), adhesion test was carried out in the same manner as in Example 1. The result are given in Table 2.

COMPARATIVE EXAMPLE 12

The procedure in Example 8 was repeated except that a sodium salt of alkyldiphenyl ether disulfonic acid (produced by Sanyo Chemical Industries, Ltd. under the tradename "Sundet BL") was used in place of the PVA having a mercapto group at an end thereof to obtain a styrene/butadiene/2-hydroxyethyl methacrylate copolymer emulsion (VII). The emulsion thus obtained was stable and had a solid concentration of 42.5%, viscosity of 85 mPas.s and an average particle diameter of 0.1μm. By the use of the aqueous emulsion (VII), adhesion test was carried out in the same manner as in Example 1. The results are given in Table 2.

COMPARATIVE EXAMPLE 13

In a pressure resistant autoclave equipped with a nitrogen injection nozzle and a thermometer was placed 100 parts of 6% PVA aqueous solution having a mercapto group at an end thereof, said PVA being the same as that used in Example 6. By the use of sulfuric acid, the solution was adjusted to pH 4.0 and thereafter incorporated with 80 parts of vinyl acetate and 2 parts of 2-hydroxyethyl acrylate. After raising the temperature of the contents in the autoclave to 60° C. and replacing atmosphere therein with nitrogen, the autoclave was pressurized with ethylene to show the pressure of 40 kg/cm² and polymerization was initiated by the use of a redox initiator of hydrogen peroxide/Rongalite system. After 4 hours from the start of polymerization, the concentration of the residual vinyl acetate monomer dropped to 0.5%. The ethylene/vinyl acetate/2-hydroxyethyl acrylate copolymer emulsion (VIII) thus obtained was stable and had a solid concentration of 50.0%, viscosity of 900 mPas.s and an average particle diameter of 0.7μm.

By the use of the aforementioned aqueous emulsion (VIII), adhesion test was carried out in the same manner as in Example 1. The results are given in Table 2.

COMPARATIVE EXAMPLES 14 AND 17

In the same manner as in Example 1, adhesion test was carried out for aqueous emulsions (I) to (IV) obtained in Examples 6 to 9, respectively except that polymethylene polyphenyl isocyanate was not used.

The results are given in Table 2.

TABLE 2

| | | | Aqueous emulsion | | | | |
|---|---|---|---|---|---|---|---|
| | | | | Properties of final emulsion | | | |
| No. | Suspending agent[1] | Composition[2] | Designation of emulsion | Stability | Concentration (%) | Viscosity (30° C.) (mPas · s) | Average particle diameter (μm) |
| Example 6 | PVA having a mercapto group at an end thereof | MMA/n-BA/HEA | (I) | Good | 50.9 | 750 | 0.9 |
| Example 7 | Carboxyl modified PVA having a mercapto group at an end thereof | St/2-EHA/HEMA | (II) | Good | 49.7 | 2800 | 0.8 |
| Example 8 | PVA having a mercapto group at an end thereof | St/Bt/HEMA | (III) | Good | 42.9 | 850 | 1.1 |
| Example 9 | PVA having a mercapto group at an end thereof | Vc/Et/HEMA | (IV) | Good | 43.3 | 1000 | 1.0 |
| Comparative Example 8 | PVA having a mercapto group at an end thereof | MMA/n-BA | (V) | Good | 50.0 | 700 | 0.9 |
| Comparative Example 9 | PVA 205 (Unmodified) | MMA/n-BA/HEA | — | Unstable | — | — | — |
| Comparative Example 10 | PVA 205/PVA 217 (Unmodified) | St/Bt/HEMA | — | Unstable | — | — | — |
| Comparative Example 11 | Nonipol 400 | St/2-EHA/HEMA | (VI) | Good | 49.8 | 110 | 0.15 |
| Comparative Example 12 | Sundet BL | St/Bt/HEMA | (VII) | Good | 42.5 | 85 | 0.1 |
| Comparative Example 13 | PVA having a mercapto group at an end thereof | Et/VAc/HEA | (VIII) | Good | 50.0 | 900 | 0.7 |

| | | | Adhesion test[3] | | | | | |
|---|---|---|---|---|---|---|---|---|
| | | Polyvalent | Dry strength | | Repeated boiling Strength | | Initial adhesive strength | |
| No. | Emulsion | isocyanate | (kg/cm$^2$) | (%) | (kg/cm$^2$) | (%) | (kg/cm$^2$) | (%) |
| Example 6 | (I) | MR-100 | 230 | (100) | 130 | (75) | 85 | (0) |
| Example 7 | (II) | MR-100 | 230 | (100) | 130 | (80) | 75 | (0) |
| Example 8 | (III) | MR-100 | 210 | (90) | 140 | (80) | 85 | (0) |
| Example 9 | (IV) | MR-100 | 210 | (90) | 130 | (70) | 80 | (0) |
| Comparative Example 8 | (V) | MR-100 | 200 | (60) | 80 | (0) | 80 | (0) |
| Comparative Example 9 | — | — | — | | — | | — | |
| Comparative Example 10 | — | — | — | | — | | — | |
| Comparative Example 11 | (VI) | MR-100 | 210 | (90) | 120 | (90) | 10 | (0) |
| Comparative Example 12 | (VII) | MR-100 | 170 | (80) | 125 | (40) | 5 | (0) |
| Comparative Example 13 | (VIII) | MR-100 | 180 | (60) | 75 | (0) | 75 | (0) |
| Comparative Example 14 | (I) | Not added | 100 | (10) | 0 | (0) | 30 | (0) |
| Comparative Example 15 | (II) | Not added | 110 | (0) | spontaneously whole delamination | | 25 | (0) |
| Comparative Example 16 | (III) | Not added | 105 | (5) | spontaneously whole delamination | | 25 | (0) |
| Comparative | (IV) | Not added | 100 | (0) | spontaneously | | 30 | (0) |

TABLE 2-continued

| Example 17 | whole delamination |
|---|---|

*[1](1) PVA having a mercapto group at an end thereof (average degree of polymerization of 550, degree of hydrolysis of 88.0 mol %, mercapto group (SH) content of 3.2 × 10$^{-5}$ equivalent/g).
(2) carboxyl modified PVA having a mercapto group at an end thereof (average degree of polymerization of 700, degree of hydrolysis of 89.2 mol %, content of carboxyl group of 1.0 mol %, mercapto group (SH) content of 2.3 × 10$^{-5}$ equivalent/g).
(3) PVA 205 (unmodified PVA, average degree of polymerization of 500, degree of hydrolysis of 88 mol %, produced by Kuraray Co., Ltd.)
(4) PVA 217 (unmodified PVA, average degree of polymerization of 1700, degree of hydrolysis of 88 mol %, produced by Kuraray Co., Ltd.)
(5) Nonipol (polyoxyethylene nonylphenyl ether having 40 mol oxyethylene units, produced by Sanyo Chemical Industries, Ltd.)
(6) Sundet BL (sodium salt of alkyldiphenyl ether disulfonic acid, produced by Sanyo Chemical Industries, Ltd.)
*[2](1) MMA - methyl methacrylate
(2) n-BA - n-butyl acrylate
(3) St - styrene
(4) 2-EHA - 2-ethylhexyl acrylate
(5) Bt - butadiene
(6) HEA - 2-hydroxyethyl acrylate
(7) HEMA - 2-hydroxyethyl methacrylate
(8) VCl - vinyl chloride
(9) Et - ethylene
(10) VAc - vinyl acetate
*[3](1) MR-100 - polymethylene polyphenyl isocyanate, produced by Nippon Polyurethane Industry Co., Ltd.
(2) Figures in parenthesis in the column of Adhesion test denote wood breakage ratio in %.

What is claimed is:

1. A composition which comprises an (A) aqueous emulsion and a (B) polyvalent isocyanate compound, wherein said (A) aqueous emulsion is selected from the group consisting of an (A-1) aqueous emulsion comprising a dispersoid which comprises a vinyl ester polymer (1) and a copolymer having a glass transition temperature of lower than 50° C. containing at least one member selected from the group consisting of methacrylic ester monomer unit and acrylic ester monomer unit; and a primary hydroxyl group-containing ethylenically unsaturated monomer unit (2), said polymer (1) being present principally in the central part of said dispersoid, said copolymer (2) being present principally in the peripheral part thereof, the ratio by weight of said polymer (1) to said copolymer (2) being in the range of 9:1 to 1:9; and a dispersant comprising a vinyl alcohol polymer and an (A-2) aqueous emulsion comprising a dispersoid which comprises a copolymer containing at least one hydrophobic unsaturated monomer unit selected from the group consisting of methacrylic ester monomer unit, acrylic ester monomer unit, styrene monomer unit, diene monomer unit and halogenated unsaturated monomer unit; and a primary hydroxyl group-containing ethylenically unsaturated monomer unit in an amount of 0.1 to 50% by weight based on said copolymer, wherein said (A-2) aqueous emulsion is obtained by emulsion polymerization in the presence of a dispersant comprising a vinyl alcohol polymer having a mercapto group at an end thereof.

2. The composition according to claim 1, wherein the (A) aqueous emulsion is an (A-1) aqueous emulsion comprising a dispersoid which comprises a vinyl ester polymer (1) and a copolymer having a glass transition temperature of lower than 50° C. containing at least one member selected from methacrylic ester monomer unit and acrylic ester monomer unit; and a primary hydroxyl group-containing ethylenically unsaturated monomer unit (2), said polymer (1) being present principally in the central part of said dispersoid, said copolymer (2) being present principally in the peripheral part thereof, the ratio by weight of said polymer (1) to said copolymer (2) being in the range of 9:1 to 1:9; and a dispersant comprising a vinyl alcohol polymer.

3. The composition according to claim 1, wherein the (A) aqueous emulsion is an (A-2) aqueous emulsion comprising a dispersoid which comprises a copolymer containing at least one hydrophobic unsaturated monomer unit selected from the group consisting of methacrylic ester monomer unit, acrylic ester monomer unit, styrenic monomer unit, diene monomer unit and halogenated unsaturated monomer unit; and a primary hydroxyl group-containing ethylenically unsaturated monomer unit in an amount of 0.1 to 50% by weight based on said copolymer; and a dispersant comprising a vinyl alcohol polymer having a mercapto group at an end thereof.

4. The composition according to claim 1, wherein a mixing ratio of said (B) polyvalent isocyanate compound is 10 to 150 parts by weight based on 100 parts by weight of solid content of said (A) aqueous emulsion.

* * * * *